US005933197A

United States Patent [19]

Kudo

[11] Patent Number: 5,933,197

[45] Date of Patent: Aug. 3, 1999

[54] DISPLAY DEVICE HAVING A VIDEO BANDWIDTH CONTROLLER

[75] Inventor: Yoshihisa Kudo, Tokyo, Japan

[73] Assignee: NEC Corporation, Tokyo, Japan

[21] Appl. No.: 08/614,059

[22] Filed: Mar. 12, 1996

[30] Foreign Application Priority Data

Mar. 15, 1995 [JP] Japan .................................... 7-055523

[51] Int. Cl.[6] ........................................................ H04N 5/46

[52] U.S. Cl. .......................... 348/555; 348/558; 348/542; 348/604; 348/711

[58] Field of Search .................................... 348/555–558, 348/541, 542, 543, 554, 708, 709, 710, 712, 713, 604, 618; 345/213; H04N 5/46

[56] References Cited

U.S. PATENT DOCUMENTS

| | | | |
|---|---|---|---|
| 4,309,719 | 1/1982 | Hinn | 348/555 |
| 4,821,112 | 4/1989 | Sakamoto et al. . | |
| 4,918,436 | 4/1990 | Johary | 345/213 |
| 5,107,188 | 4/1992 | Rindal . | |
| 5,146,331 | 9/1992 | Tsuchida | 348/556 |
| 5,285,197 | 2/1994 | Schmidt et al. | 345/213 |
| 5,414,473 | 5/1995 | Hong | 348/625 |
| 5,673,088 | 9/1997 | Nah | 348/555 |

FOREIGN PATENT DOCUMENTS

| | | |
|---|---|---|
| 0 065 150 | 11/1982 | European Pat. Off. . |
| 0 399 649 | 11/1990 | European Pat. Off. . |
| 52-10363 | 8/1993 | Japan . |

OTHER PUBLICATIONS

"Mac Life", No. 53, Jan. 1993.

"NHK Television Technology Textbook", vol. 1.

*Primary Examiner*—Michael H. Lee

*Attorney, Agent, or Firm*—Young & Thompson

[57] ABSTRACT

A synchronizing frequency of red (R), green (G) and blue (B) video signals is detected by a frequency detector. The resolution of the RGB video signals is calculated by a calculator. When the resolution of the RGB video signals is close to the resolution of a cathode-ray-tube (CRT), a high level signal is generated as a control signal from a control signal generator. When the high level signal is generated from the generator, the video bandwidth of the RGB video signals is limited by a video bandwidth limiting circuit to adapt the RGB video signal to characteristics of the CRT.

5 Claims, 7 Drawing Sheets

DISPLAY DEVICE HAVING A VIDEO BANDWIDTH CONTROLLER

BACKGROUND OF THE INVENTION

1. Field of the Invention

The present invention relates to a display device having a video bandwidth controller and a method for controlling the video bandwidth. More particularly, the invention relates to a display device having a video bandwidth controller and to a method for displaying two or more different types of red (R), green (G) and blue (B) video signals.

2. Description of the Related Art

Conventionally, display devices having a resolution equal to or higher than that of RGB video signals being input to the display device have been used for displaying the RGB video signals. It is known to switch from a RGB video signals with a normal resolution to RGB video signals with a higher resolution. It is also known that RGB signals with different resolutions can be generated in a single computer. A display device which is connected to a computer having such a function needs to display RGB signals with different resolutions, as disclosed in "MAC LIFE No. 53, January 1993".

In such a case, conventionally, the resolution of a cathode-ray tube (CRT) is fixed. Furthermore, in a stripe type CRT as disclosed in "NHK Television Technology Textbook (Vol. 1)", electron beams which pass through a shadow mask actually act on the display area of the CRT. Referring to FIGS. 1 and 2, electron beams from three electron guns 14 which are respectively used for red (R) beam, green (G) beam and blue (B) beam pass through a slit 12 in the shadow mask 11 and make RGB phosphors 13 emit light. In a CRT configured in this manner, pictures are represented by 30 percent or less of the entire electron beam emitted from the electron guns.

In this case, the RGB signals being provided to the display device are produced based on a dot clock which is a reference clock corresponding to one dot. Therefore, the RGB is signals level may change on a per dot basis. For example, the relationship among an input signal S0, a beam B0 which passes through a slit 12 of the shadow mask 11, and light emission P0 of a phosphor surface, in conjunction with the positional relationship between the slit 12 and the phosphor surface, is shown in FIGS. 3A to 3E. Referring to FIGS. 3A to 3E, the input signal is a voltage (E) signal, and the beams emitted from electron guns according to the input signal are scanned in such a manner that the position of the beams with respect to the shadow mask 11 sequentially moves as time (t) elapses. When the input signal S0 is input, beam B0 which passes through the slit 12 hits the phosphor 13 on the CRT.

Considering the frequency characteristic of an input signal, however, the actual input signal would be an input signal S1 as shown in FIG. 4C. Comparing the original input signal S0 in FIG. 3C, with the input signal S1 in FIG. 4A, the shadow mask pitch of the CRT is smaller than the pitch of the RGB signal corresponding to one dot, therefore, there would be cases in which the width of the black portion corresponding to one dot displayed on the CRT is smaller than that of the original signal. This phenomenon causes the line thickness of a black character displayed on white background to be partially reduced.

Furthermore, for an input signal S2, which has a still lower frequency characteristic, a passing beam B2, phosphor surface light emission luminance P2, and phosphor surface luminance L2 would be as illustrated in FIGS. 5A to 5E. As mentioned above, the input signals S1 and S2 are input to the display device as the RGB signals, the line thickness of a black character displayed on white background is partially reduced and the character's appearance becomes blurred.

SUMMARY OF THE INVENTION

It is an object of the present invention to provide a display device and a method of controlling a display device capable of displaying at least two different types of RGB signals.

It is another object of the present invention to provide a display device and a method of controlling a display device capable of properly reproducing at least two different types of RGB video signals by adapting the video bandwidth of the video signal to the characteristics of a CRT.

It is a further object of the present invention to provide a display device and a method of controlling a display device capable of improving the apparent contrast of black characters on white background.

It is a still further object of the present invention to provide a video bandwidth controller capable of adapting the video bandwidth of a video signal to the characteristics of a CRT.

To achieve the above objects, the display device of the present invention detects a synchronizing frequency of a input video signal in a frequency detecting means. Then, the video bandwidth of the input video signal is controlled according to the synchronizing frequency in a video bandwidth controller.

Further, the video bandwidth controller calculates the resolution of the input video signal according to the synchronizing frequency and controls the video bandwidth of the input video signal according to the calculated resolution.

BRIEF DESCRIPTION OF THE DRAWINGS

The above and other objects, features and advantages of the present invention will become more apparent from the following description taken in conjunction with the accompanying drawings, wherein.

DETAILED DESCRIPTION OF THE PREFERRED EMBODIMENT

Now, the preferred embodiment of the present invention will be described in detail with reference to the drawings.

Figure 1:
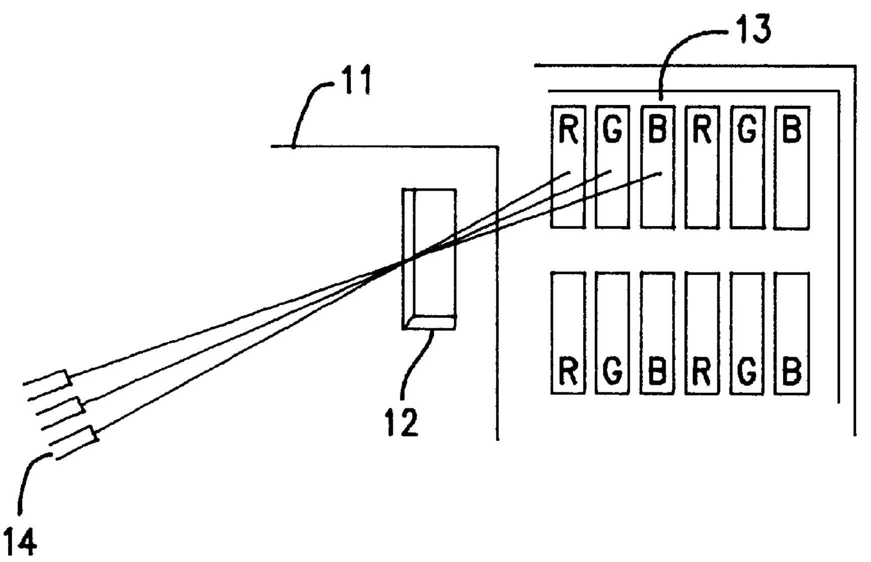
FIG. 1 PRIOR ART
FIG. 1 is a diagram showing a conventional display operation on a cathode-ray-tube (CRT).
Figure 2:
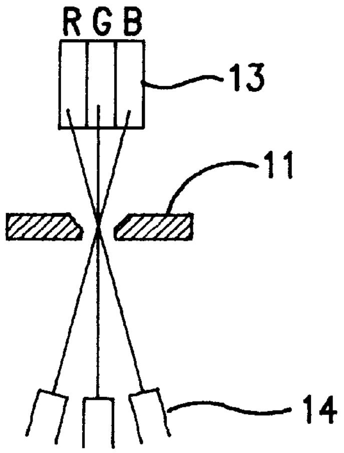
FIG. 2 PRIOR ART
FIG. 2 is a diagram showing a conventional display operation on a CRT.
Figures 3A, 3B, 3C, 3D, 3E:
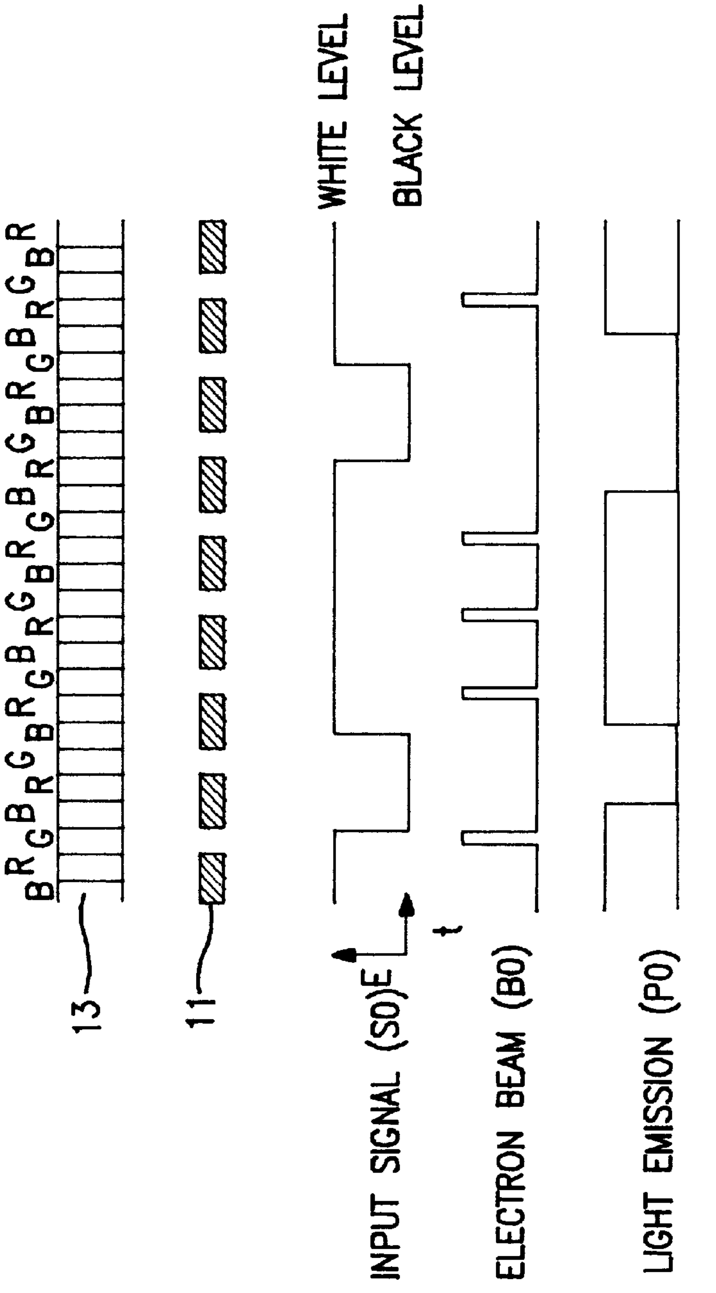
FIG. 3A PRIOR ART
FIG. 3B PRIOR ART
FIG. 3C PRIOR ART
FIG. 3D PRIOR ART
FIG. 3E PRIOR ART
FIG. 3A is a diagram showing a phosphor surface of the CRT.
FIG. 3B is a diagram showing a shadow mask of the CRT.
FIG. 3C is a waveform diagram showing an input signal S0.
FIG. 3D is a diagram showing electron beams B0 passing through the shadow mask according to the input signal S0.
FIG. 3E is a diagram showing light emission P0 of a phosphor surface.
Figures 4A, 4B, 4C, 4D, 5A, 5B, 5C, 5D:
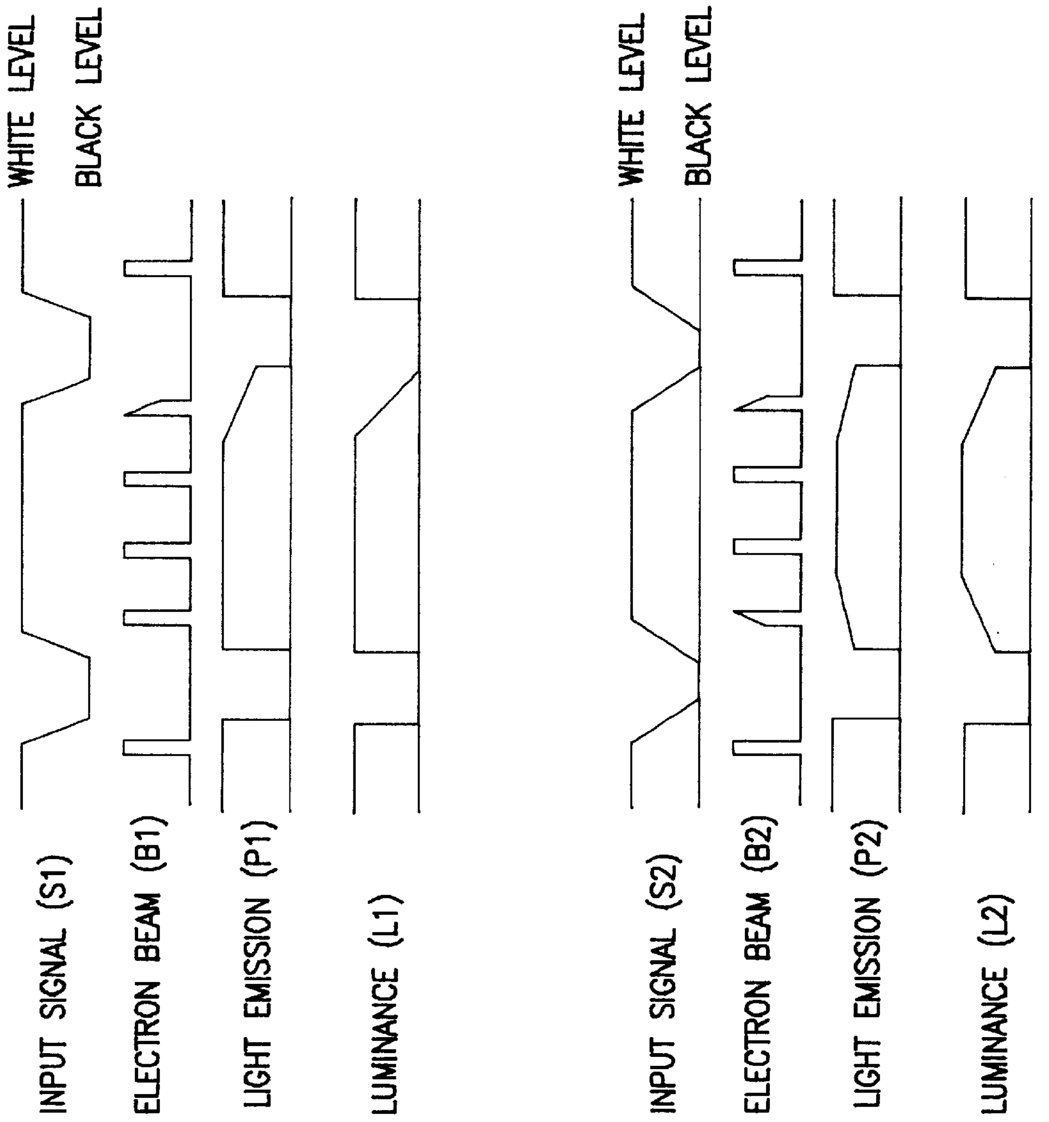
FIG. 4A PRIOR ART
FIG. 4B PRIOR ART
FIG. 4C PRIOR ART
FIG. 4D PRIOR ART
FIG. 5A PRIOR ART
FIG. 5B PRIOR ART
FIG. 5C PRIOR ART
FIG. 5D PRIOR ART
FIG. 4A is a waveform diagram showing an input signal S1.
FIG. 4B is a diagram showing electron beams B1 passing through the shadow mask according to the input signal S1.
FIG. 4C is a diagram showing light emission P1 of a phosphor surface.
FIG. 4D is a diagram showing a luminance L1 of the phosphor surface.
FIG. 5A is a waveform diagram showing an input signal S2.
FIG. 5B is a diagram showing electron beams B2 passing through the shadow mask according to the input signal S2.
FIG. 5C is a diagram showing light emission P2 of a phosphor surface.
FIG. 5D is a diagram showing a luminance L2 of the phosphor surface.
Figure 6:
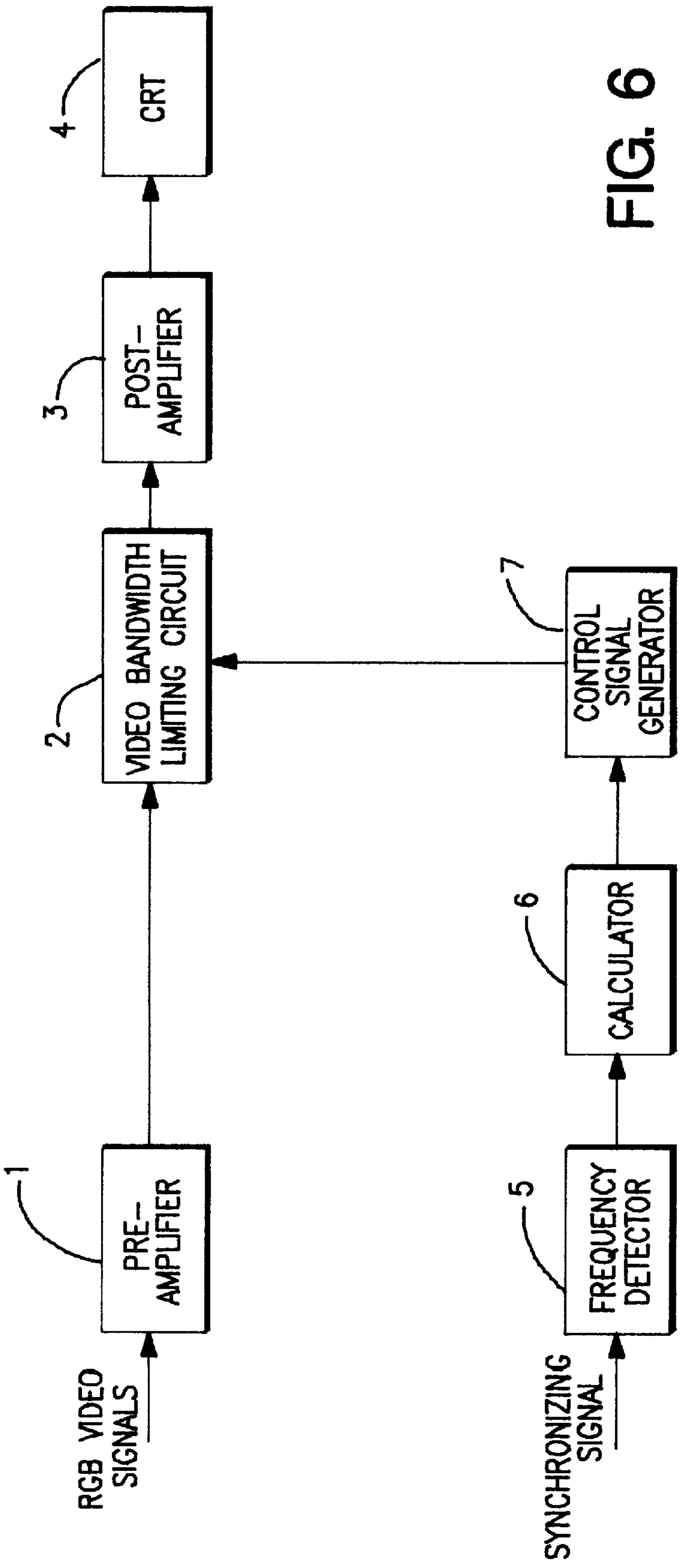
FIG. 6 is a block diagram showing a display device according to an embodiment of the present invention.

Referring to FIG. 6, a red (R), green (G) and blue (B) video signals and a synchronizing signal are input separately to a video bandwidth controller of the embodiment. A pre-amplifier 1 amplifies the input RGB video signals for stabilizing subsequent signal processing. The RGB video signals are provided to the pre-amplifier 1 and converted into a low impedance output signal so as not to affect the circuits in later stages with respect to their circuit operation. A video bandwidth limiting circuit 2 performs video bandwidth limiting process on the RGB video signals based on a control signal provided from a control signal generator 7 so as to adapt the video bandwidth of the RGB video signals to the characteristics of the cathode-ray-tube (CRT). The post-amplifier 3 is a video signal amplifier for displaying the RGB video signals, and video signals amplified by the post-amplifier 3 are visually displayed by the CRT 4.

A frequency detector 5 detects at least one frequency of a horizontal synchronizing signal and vertical synchronizing signal. Here, the frequency of the horizontal synchronizing signal is a horizontal synchronizing frequency and the frequency of the vertical synchronizing signal is a vertical synchronizing frequency. The calculator 6 calculates the number of vertical lines according to the horizontal synchronizing frequency and the vertical synchronizing frequency. Here, the number of the vertical lines represents the number of the horizontal synchronizing lines per vertical period. The calculator 6 calculates the number of the vertical lines based on the equation, (1/vertical synchronizing frequency)/(1/horizontal synchronizing frequency). Further, the calculator 6 calculates resolution of the RGB video signal according to the number of the vertical lines. For example, when the vertical synchronizing frequency is 60 KHz and the horizontal synchronizing frequency is 31.5 KHz, the number of the vertical lines is 525. Available RGB video signal resolutions comprise, for example, 640×4807, 720×400, 800×600, 1024×768, 1120×750, 1280×1024, 1600×1200 (the number of horizontal dots×the number of vertical lines). The resolution whose number of the vertical lines is the closest to 525 and less than 525 is 640×480. Therefore, The resolution 640×480 is obtained as the resolution of the RGB video signal by the calculator 6.

Furthermore, the calculator 6 may have a memory wherein the resolution of the RGB video signals corresponding to at least one frequency of the horizontal synchronizing signal and the vertical synchronizing signal are stored, thus allowing the resolution of the RGB video signals to be read out from memory according to the synchronizing signal detected by the detector 5.

The control signal generator 7 generates either a high level signal or a low level signal as the control signal according to the resolution of the RGB video signal obtained by the calculator 6. The resolution of the RGB video signal is compared with the resolution of the CRT in the generator 7. When the resolution of the CRT is close to that of the RGB video signal, for example, lower than twice that of the RGB video signals, the generator 7 generates the high level signal to cause the video bandwidth limiting circuit 2 to limit the video bandwidth of the RGB video signals. On the other hand, when the resolution of the CRT is higher than twice that of the RGB video signals or lower than that of the RGB video signals, the generator 7 generates the low level signal so that the limiting circuit 2 does not limit the video bandwidth of the RGB video signals. Here, the resolution of the CRT is predetermined according to the visual size of the CRT and the dot pitch of the phosphor of the CRT. For example, when the visual sizes are 27 inches and the dot pitch is 0.8 mm, the number of the horizontal dots is 652.

Now, when the RGB video signals having the resolution 640×480 are input, the dot clock of the signals is 28.25 MHz. Therefore, the video bandwidth required is conventionally about 30 MHz. However, when a CRT whose number of the horizontal dots is 652 is used, the resolution of the CRT is lower than twice that of the RGB video signals. Therefore, the generator 7 generates the high level signal so that the video bandwidth of the RGB video signals is limited to 15 MHz for adapting the RGB video signals to the characteristics of the CRT, using the limiting circuit 2.

On the other hand, when the RGB video signals having a resolution 800×600 or 1024×768 are input, the resolution of the RGB video signals is higher than that of the CRT. Therefore, the generator 7 generates the low level signal so that the video bandwidth of the RGB video signals is not limited in the limiting circuit 2.

Figure 7:
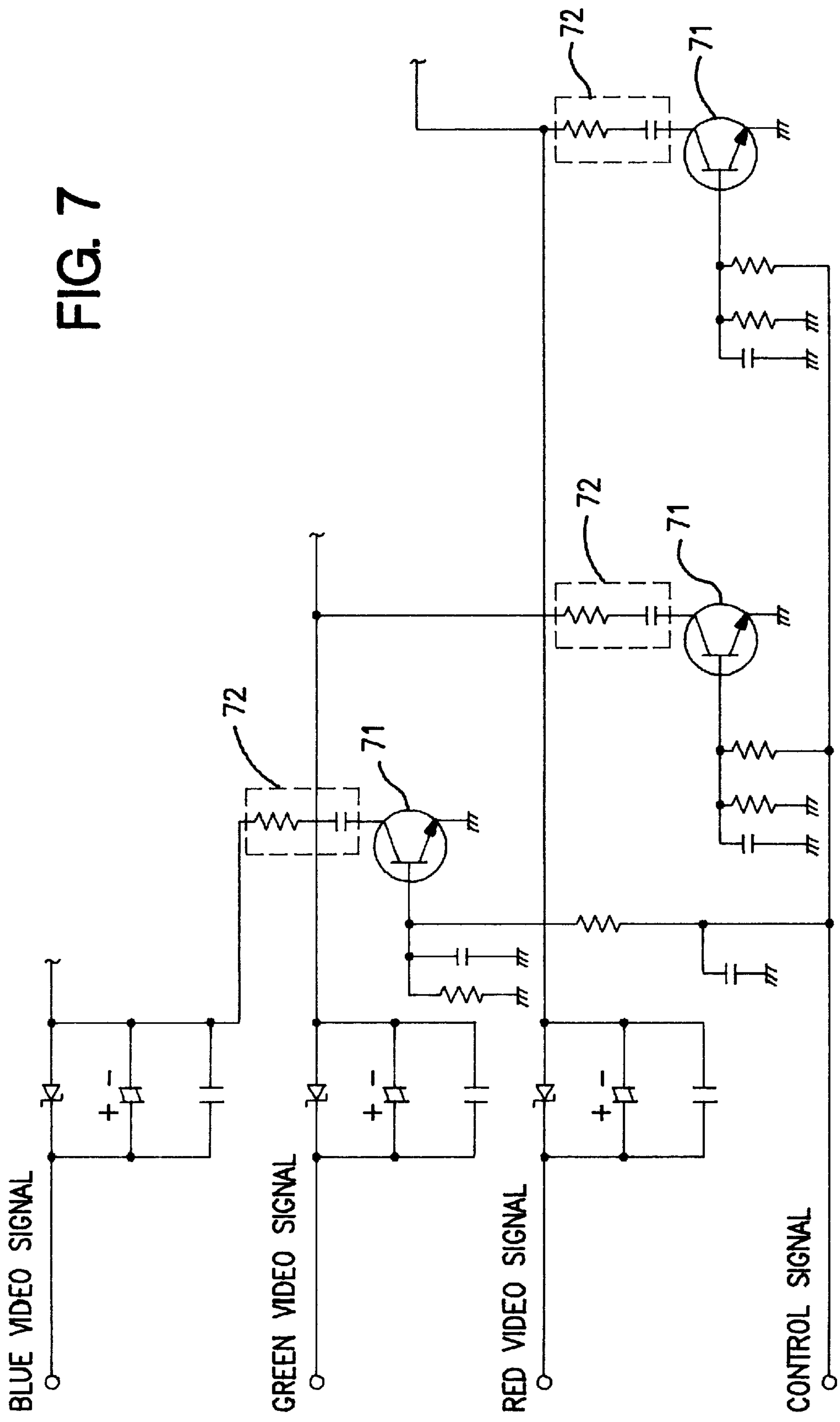
FIG. 7 is a circuit diagram showing the video bandwidth limiting circuit in FIG. 6.

Referring to FIG. 7, the video bandwidth limiting circuit 2 comprises a switching circuit 71 having a transistor and a low pass filter (LPF) 72. Here, those skilled in the art and having the benefit of the detailed circuit shown in FIG. 7 will appreciate and understand how the well known circuit operates. Accordingly, a detailed discussion of circuit shown in FIG. 7 is not provided here. However, when a high level signal is generated from the control signal generator 7, the switching circuit 71 is rendered conductive and the LPF 72 limits the video bandwidth of the RGB video signals. On the other hand, when a low-level signal is generated from the control signal generator 7, the switching circuit 71 is rendered non-conductive and the video bandwidth of the RGB video signals is not limited.

Next, the operation of the video bandwidth controller in the embodiment of the present invention will be described with reference to FIGS. 8A to 8G.

Figures 8A, 8B, 8C, 8D, 8E, 8F, 8G:
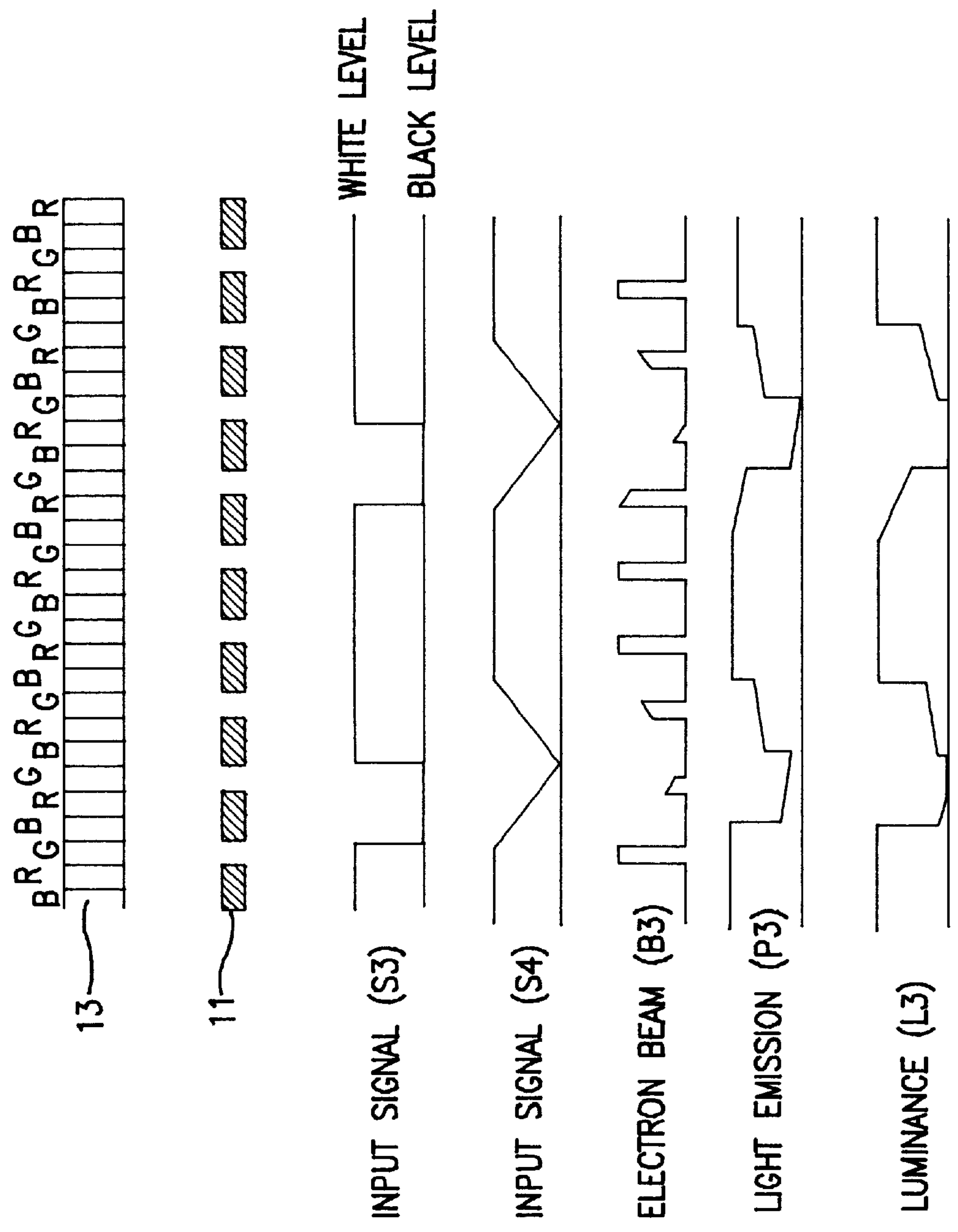
FIG. 8A is a diagram showing a phosphor surface of the CRT.
FIG. 8B is a diagram showing a shadow mask of the CRT.
FIG. 8C is a waveform diagram showing an input signal S3.
FIG. 8D is a waveform diagram showing an input signal S4 obtained by limiting the video bandwidth of the input signal S3.
FIG. 8E is a diagram showing electron beams B3 passing through the shadow mask according to the input signal S4.
FIG. 8F is a diagram showing light emission P3 of a phosphor surface.
FIG. 8G is a diagram showing a luminance L3 of the phosphor surface.

Referring to FIG. 8C, the dot pitch of the input signal S3 is a little larger than that of the phosphor 13. That is, the resolution of the CRT is lower than twice that of the RGB video signals. Therefore, the input signal S3 is converted into the input signal S4 by the video bandwidth controller to adapt the RGB video signals to the characteristics of the CRT. Referring to FIG. 8D, the input signal S4 is a bandwidth-limited video signal and has a waveform inclined at a rising part and a falling part thereof compared with the input signal S3.

When the input signal S3 is converted into the input signal S4 by being bandwidth-limited, the distribution of the electron beams which hit on the phosphor surface of the CRT would be the light emission P3 of the phosphor surface shown in FIG. 8F. The intensity of light emission of the phosphor surface of the CRT 4 by hitting the electron beams passing through the slit 12 in the shadow mask 11 is proportional to the anode current [I] of the electron gun.

Figure 9:
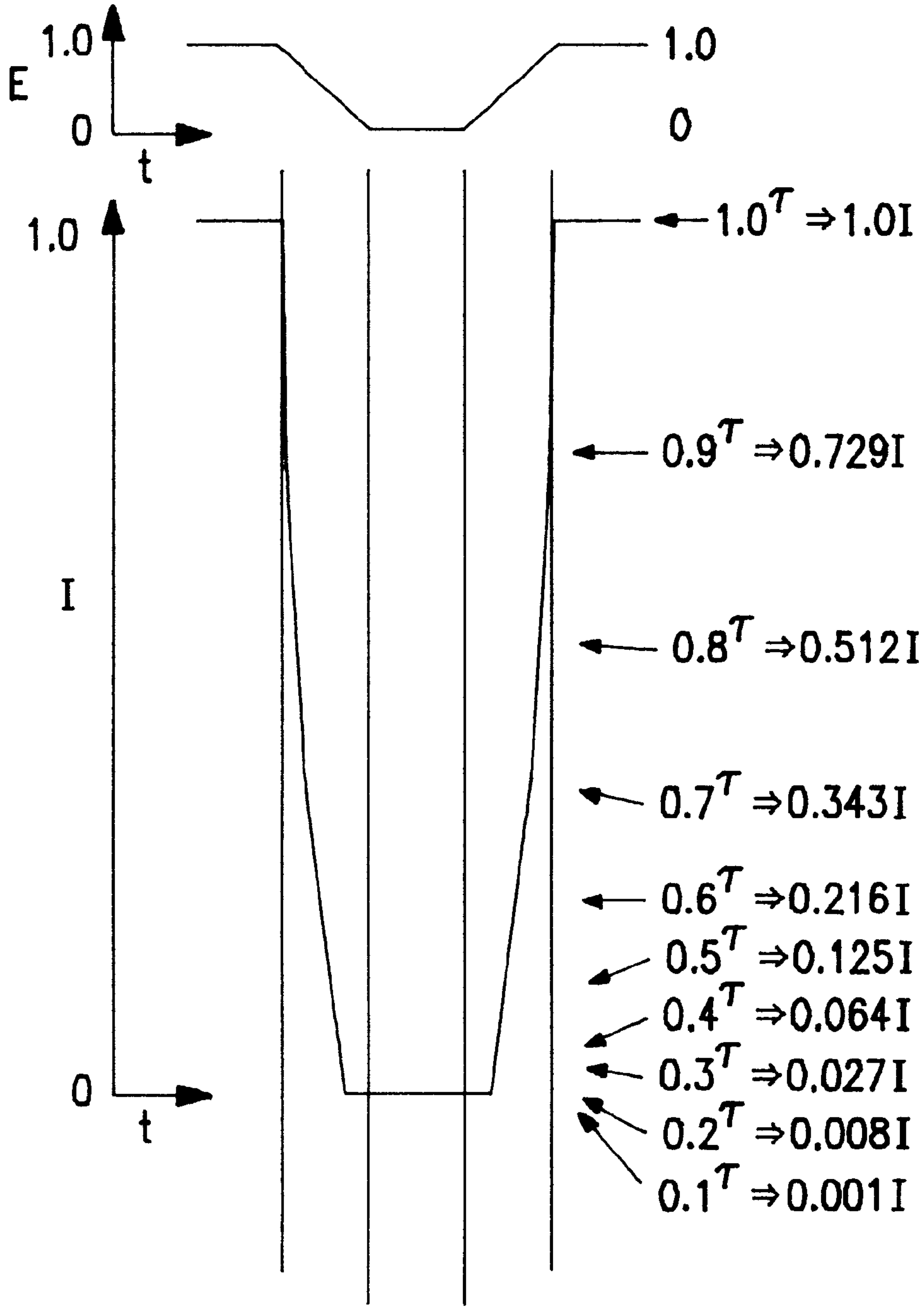
FIG. 9 is a diagram showing the relationship between an input signal voltage [E] and an anode current [I] and the relationship between an intensity of light emission and current [I].

The relationship between the voltage [E] of the input signal and the anode current [I] is expressed by the following equation.

$$I=KE^{\gamma} \tag{1}$$

where, K is a constant factor and, $\gamma$ is typically in the range from 2.6 to 3.0. The relationship between the voltage [E] and the current [I] and the relationship between the intensity of light emission and the current [I] is shown in FIGS. 9A and 9B, when $\gamma$=3.0 and K=1.0 in this equation.

Applying this equation to the phosphor surface light emission P3 shown in FIG. 8F results in the phosphor surface luminance L3 shown in FIG. 8G and the light emission on the CRT 11 has an appearance wherein only the black components are wide. After this video bandwidth limitation process, the thickness of lines of a black character on white background increases, and thus the apparent contrast of the character increases.

In a display device having limited dote or striped phosphor coated screen in this embodiment, the display degradation may be prevented by limiting the bandwidth of a signal to meet the resolution of a display area. Thus, a good, reproducible image may be achieved by automatically setting a video bandwidth suitable for a CRT for use with different RGB signals differing in dot clock. The apparent contrast of a black character on a white background, which is commonly used on the display screen of personal computers, may thus be improved. Furthermore, for low dot clock frequencies, the signal to noise ratio may be improved and radiation noise may be reduced by intentionally narrowing the video bandwidth.

While a preferred embodiment of the invention has been described, the invention is not limited thereto and various modifications may be made thereto without departing from the spirit and scope of the invention.

I claim:

1. A display device comprising:

frequency detecting means for detecting a synchronizing frequency of a video signal input to said display device to seek a resolution of said video signal;

video bandwidth controlling means for controlling a video bandwidth of said video signal according to said synchronizing frequency so that said resolution of said video signal is adapted to a resolution of a display area, said video bandwidth controlling means comprising calculating means for calculating the resolution of said input video signal according to said synchronizing frequency, comparing means for comparing said resolution calculated by said calculating means with a predetermined display resolution and controlling means for controlling said video bandwidth of said input video signal according to a comparison result of said comparing means, said synchronizing frequency comprises a horizontal synchronizing frequency and a vertical synchronizing frequency, and said calculating means calculates said resolution of said input video signal by dividing said horizontal synchronizing frequency by said vertical synchronizing frequency.

2. The display device as claimed in claim 1, wherein said input video signal comprises red (R), green (G) and blue (B) video signals.

3. The display device as claimed in claim 1, wherein said controlling means comprises generating means for generating a control signal when the resolution of said display area is less than twice that of said input video signal, and video bandwidth limiting means for limiting said video bandwidth of said input video signal for adapting said input video signal to characteristics of said display area depending on said control signal generated from said generating means.

4. The display device as claimed in claim 3, wherein said video bandwidth limiting means comprises a switching circuit which is rendered conductive when said control signal is generated from said generating means and a low pass filter means for limiting said video bandwidth of said input video signal when said switching circuit is conductive.

5. The display device as claimed in claim 1, wherein said resolution is a number of horizontal lines per vertical period of said input video signal.

* * * * *